US012652377B2

(12) United States Patent
Presa et al.

(10) Patent No.: US 12,652,377 B2
(45) Date of Patent: Jun. 9, 2026

(54) AUTOSTEREOSCOPIC DISPLAY DEVICE HAVING A REMOTE BODY TRACKING SYSTEM

(71) Applicant: DIMENCO HOLDING B.V., Veldhoven (NL)

(72) Inventors: Silvino José Antuña Presa, Veldhoven (NL); Sander Johannes Brouwers, Veldhoven (NL)

(73) Assignee: Dimenco Holding B.V., Veldhoven (NL)

( * ) Notice: Subject to any disclaimer, the term of this patent is extended or adjusted under 35 U.S.C. 154(b) by 109 days.

(21) Appl. No.: 18/725,494

(22) PCT Filed: Dec. 29, 2022

(86) PCT No.: PCT/NL2022/050764
§ 371 (c)(1),
(2) Date: Jul. 1, 2024

(87) PCT Pub. No.: WO2023/128762
PCT Pub. Date: Jul. 6, 2023

(65) Prior Publication Data
US 2025/0175587 A1       May 29, 2025

(30) Foreign Application Priority Data
Dec. 29, 2021     (NL) ..................................... 2030326

(51) Int. Cl.
*H04N 13/302*          (2018.01)
*H04N 13/366*          (2018.01)
(52) U.S. Cl.
CPC ......... *H04N 13/366* (2018.05); *H04N 13/302* (2018.05)

(58) Field of Classification Search
CPC .......... G06F 3/012; G06F 3/013; G06F 3/017; H04N 13/302; H04N 13/366
See application file for complete search history.

(56) References Cited

U.S. PATENT DOCUMENTS

2008/0143895 A1     6/2008   Peterka et al.
2012/0047465 A1*    2/2012   Noda ..................... G06F 3/0346
                                                        715/848

(Continued)

FOREIGN PATENT DOCUMENTS

EP          3842900 A1      6/2021
WO       2008132724 A1     11/2008
WO       2016102948 A1      6/2016

OTHER PUBLICATIONS

International Search Report for PCT/NL2022/050764 dated Mar. 15, 2023, 4 pages.

(Continued)

*Primary Examiner* — Yuzhen Shen
(74) *Attorney, Agent, or Firm* — Schwegman, Lundberg & Woessner, P.A.

(57)                ABSTRACT

The invention relates to a method for tracking a relevant body part of a viewer of an autostereoscopic screen, using a head tracking system that is integrated with the screen as well as a body tracking system that is remote from the screen. By tracking the head of a viewer simultaneously by both systems, it is possible to relate the position data of all other body parts obtained with the remote body tracking system to the position of the screen. In this way, the position of such body parts relative to the screen can be obtained, even when they are out of a field of view of the integrated head tracking system. In this way, a more accurate and therefore more realistic interaction of the viewer with displayed content can be achieved.

15 Claims, 1 Drawing Sheet

(56)             References Cited

U.S. PATENT DOCUMENTS

2012/0120195 A1*   5/2012   Shows ................. H04N 13/128
                                                          348/46
2013/0120360 A1*   5/2013   Hsu ...................... H04N 13/128
                                                          345/419
2015/0281682 A1*   10/2015   Van Der Horst .... H04N 13/376
                                                          348/59
2019/0091565 A1*   3/2019   Nelson ................ G07F 17/3216

OTHER PUBLICATIONS

Written Opinion of the ISA for PCT/NL2022/050764 dated Mar. 15, 2023, 4 pages.

* cited by examiner

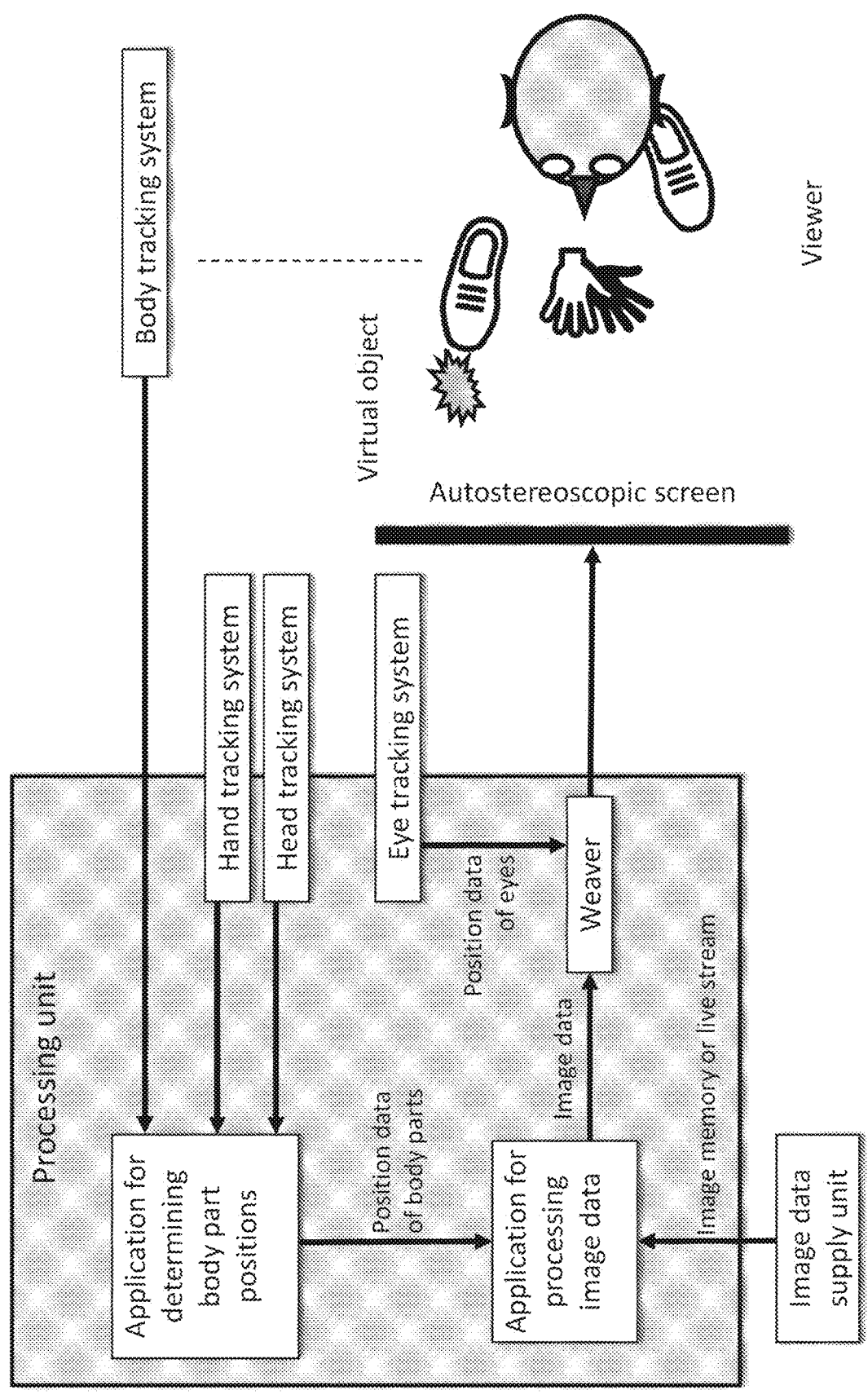

AUTOSTEREOSCOPIC DISPLAY DEVICE HAVING A REMOTE BODY TRACKING SYSTEM

CROSS-REFERENCE TO RELATED APPLICATIONS

This application is the U.S. national phase of International Application No. PCT/NL2022/050764 filed Dec. 29, 2022 which designated the U.S. and claims priority to NL Patent Application No. 2030326 filed Dec. 29, 2021, the entire contents of each of which are hereby incorporated by reference.

FIELD OF THE INVENTION

The invention relates to a method for tracking a relevant body part of a viewer of an autostereoscopic display device.

BACKGROUND

Autostereoscopic displays have attracted great attention in the last two decades. One of their most outstanding features is that they allow a viewer to perceive three-dimensional images without a dedicated eyewear device such as a head set, a head-mounted display, glasses, etc. It is in particular possible to account for movement of the viewer relative to the display. Key to this technology is the presence of a screen that comprises a lenticular lens or parallax barrier. This enables that a left eye image is directed to a left eye of the viewer and a right eye image to a right eye of the viewer. A viewer is so allowed to perceive a three-dimensional image, some parts of which appear to be in front of the display, other parts of which appear to be further away than the display ('behind' the display). It is preferred with such displays that the position of the eyes is tracked with an eye tracking system, as this allows a better directing of the left eye image and right eye image to the respective eye.

In particular autostereoscopic displays, the three-dimensional images are however not only displayed, it is also possible for the viewer to interact with them. For example, a foot may hit a virtual object or a hand may push a virtual button. Such combination may contribute to a truly believable three-dimensional virtual environment to a viewer. To achieve a realistic interaction of the viewer with displayed content, the body parts that he uses for the interaction need to be tracked.

Since eyes are typically constantly in front of the autostereoscopic display, an eye tracking system is usually installed close to the display to have a field of view that is similar to that of the display. This is however different for other body parts, since these may well get out of the display's field of view, especially extremities such as hands, legs and feet. Therefore, the tracking systems thereof, usually unified in a single system that is called a 'body tracking system', are preferably positioned at a location where the entire body is well visible. This is usually not achieved by attaching it to the autostereoscopic display, but remote from it. This means that a body tracking system is generally positioned at a location that is at the viewer's discretion, depending on the space available to him. So, when arbitrarily positioned relative to the autostereoscopic display, it is for a body tracking system not as straightforward as for an eye tracking system to perform the tracking relative to the autostereoscopic display. A possible solution to this problem should not lead to delayed responses of the autostereoscopic display (i.e. no increased latency). Moreover, it is desired that the autostereoscopic display forms a robust system with the remote body tracking system that is not easily disturbed by an accidental movement of any of the devices. It is also important that it is convenient to the viewer; he should not be confronted with tedious calibration procedures any time he wishes to use the autostereoscopic display and interact with the content displayed on it.

SUMMARY OF THE INVENTION

It is therefore an object of the present invention to provide an accurate and robust method to use a separate body tracking system in combination with an autostereoscopic display device. It is a further object to achieve a more realistic interaction of the viewer with displayed content.

It has now been found that one or more of these objects can be reached by using head position data obtained with a separate head tracking system. Accordingly, the present invention relates to a method for tracking a relevant body part of a viewer of an autostereoscopic display device, wherein the autostereoscopic display device comprises
- an integrated head tracking system configured to determine the position of the head of the viewer relative to the autostereoscopic display device;
- a remote body tracking system configured to determine the position of the head and the relevant body part of the viewer relative to the remote body tracking system;

wherein the method comprises the steps of
1) determining the position of the head of the viewer relative to the autostereoscopic display device using the integrated head tracking system;
2) determining the position of the head of the viewer and the relevant body part of the viewer relative to the remote body tracking system using the remote body tracking system;
3) determining the position of the relevant body part of the viewer relative to the autostereoscopic display device using the position of the head obtained in step 1) and the position of the head obtained in step 2).

BRIEF DESCRIPTION OF THE DRAWINGS

FIG. 1 is a schematical top view of a setting wherein the method of the invention may be carried out.

DETAILED DESCRIPTION OF THE INVENTION

Elements in the figures are illustrated for simplicity and clarity and have not necessarily been drawn to scale. For example, the dimensions of some of the elements in the FIGURES may be exaggerated relative to other elements to help improve understanding of various exemplary embodiments of the present invention. In particular, the relative dimensions of a viewer, an autostereoscopic screen and a virtual object in a particular setting cannot be derived from the FIGURES. Also, the FIGURES provide no indication of the relative positioning of the different tracking systems, other than that a remote body tracking system is drawn further away from the autostereoscopic display device than the integrated tracking systems. Furthermore, the terms "first", "second", and the like herein, if any, are generally used for distinguishing between similar elements and not necessarily for describing a sequential or chronological order.

Throughout the description and claims, the terms 'three-dimensional image' and 'autostereoscopic image', are used interchangeably and refer to the same type of image. It is herewith recognized that an autostereoscopic image is strictly spoken not the same as a three-dimensional image. An autostereoscopic image is an image that is only perceived by a viewer as being three-dimensional, since it is composed of a left image that is to be presented to a left eye of the viewer and a right image that is to be presented to a right eye of the viewer.

In the context of the invention, by the term 'viewer' is meant a person consuming the content that is presented to him according to the method of the invention. Besides viewing the three-dimensional image, the viewer may also experience other sensory stimulus such as sound or haptic stimulus. For convenience, however, the person is consequently referred to as 'viewer', although it is understood that he may at the same time also be e.g. a 'listener'.

Throughout the text, references to the viewer will be made by male words like 'he', 'him' or 'his'. This is only for the purpose of clarity and conciseness, and it is understood that female words like 'she', and 'her' equally apply.

When referring to an 'integrated' tracking system, such as an integrated eye tracking system, an integrated head tracking system and an integrated hand tracking system, it is meant that the tracking hardware of such tracking system forms an integral part of the autostereoscopic display device. In particular, in an 'integrated' tracking system, any sensor for determining the position of a body part relative to the sensor has a fixed and known position relative to the screen. For this reason, the sensor in such tracking system can equally be used as a sensor for determining the position of a body part relative to the screen.

When referring to a 'remote' tracking system, such as a body tracking system, it is meant that tracking hardware of such tracking system is still associated with the autostereoscopic display device, but does not form an integral part thereof. This means that it is in electrical communication with the autostereoscopic display device (e.g. by wire or wireless), but does not necessarily have a fixed and known position relative to the screen. In particular, in a 'remote' tracking system, any sensor for determining the position of a body part relative to the sensor is designed to be placed by a viewer at a suitable but not predetermined position relative to the autostereoscopic display device. The placement of the sensor is at the viewer's discretion and therefore its position may vary from one viewing session to another.

A method of the invention makes use of an autostereoscopic display device. This is typically a display device that is largely stationary in the real world during its use, such as a desktop device or a wall-mounted device. For example, the autostereoscopic display device is a television, a (desktop) computer with a monitor, a laptop, or a cinema display system. It may however also be a portable display device such as a mobile phone, a tablet or a game console, allowing a viewer to (freely) move in the real world together with the autostereoscopic display device.

Autostereoscopic display devices are known in the art, e.g. from WO2013120785A2. The main components of an autostereoscopic display device used in a method of the invention typically are an autostereoscopic screen, an integrated eye tracking system, an integrated head tracking system, a remote body tracking system, an image data supply unit and a processing unit. Optionally, the autostereoscopic display device comprises also an integrated hand tracking system.

The autostereoscopic screen is driven by the processing unit and comprises means for displaying a three-dimensional image to a viewer whose eyes are tracked by the integrated eye tracking system. Such means comprise an array of pixels for producing a display output and a parallax barrier or a lenticular lens that is provided over the array to direct a left image to the viewer's left eye and a right image to the viewer's right eye.

The integrated eye tracking system comprises means for tracking the position of the viewer's eyes relative to the autostereoscopic display device (more specifically relative to the screen) and is in electrical communication with the processing unit, in particular to the weaver therein. The integrated eye tracking system allows the screen to produce a left image that is directed specifically to the viewer's left eye and a right image that is directed specifically to the viewer's right eye. To this end, the integrated eye tracking system is typically a fixed part of the autostereoscopic display device in that it has a fixed and known position relative to the screen.

The integrated head tracking system comprises means for tracking the position of the viewer's head relative to the autostereoscopic display device (more specifically relative to the screen) and is in electrical communication with the processing unit. To this end, the integrated head tracking system is typically a fixed part of the autostereoscopic display device in that it has a fixed and known position relative to the screen.

The remote body tracking system comprises means for simultaneously tracking the position of a plurality of body parts of the viewer relative to the autostereoscopic display device and is in electrical communication with the processing unit. The tracked body parts are at least a head and one or more other body parts, preferably selected from the group of torso, knees, elbows, forearms, upper arms, shoulders, lower legs, upper legs, hips, hands and feet. Preferably, the system is configured such that the tracking of the entire body can be performed by deriving it from the tracking of a selection of separate body parts, e.g. by means of interpolation. The remote body tracking system does not need to have a fixed position relative to the screen and may be positioned at any suitable location relative to the screen, where it is not required (or even useful) to know the position of such location relative to the screen.

The image data supply unit serves to provide image data to the processing unit. This may be a memory comprising a recording of a scene or an animation. It may also be a unit that is configured to receive a live streamed video recording of a scene.

The processing unit receives position data from the integrated eye tracking system, the integrated head tracking system, the optional integrated hand tracking system and the remote body tracking system; and it receives image data from the image data supply unit (image memory or live stream). The processing unit is configured to produce image data and to drive the screen therewith, taking into account the eye position data obtained by the eye tracking system. An important component of the processing unit is therefore the so-called 'weaver', which weaves a left image and a right image to the array of pixels, thereby determining which pixels are to produce pixel output in correspondence with the respective image. In this way, a three-dimensional image can be displayed from image data, to a viewer at a particular position.

The processing unit typically comprises an application for determining body part positions, which is an application wherein the position data of the different tracking systems are combined to yield true position data on particular body parts. The processing unit typically also comprises an application for the processing of image data from the image data supply unit. This application also receives the position data from the application for determining body part positions.

An optional integrated hand tracking system comprises means for tracking the position of a viewer's hand (or hands) relative to the autostereoscopic display device (more specifically relative to the screen) and is in electrical communication with the processing unit. To this end, the integrated hand tracking system is typically a fixed part of the autostereoscopic display device in that it has a fixed and known position relative to the screen In a method of the invention, the device may further be provided with additional features such as means to record a scene in the field of view of the screen and audio means to play sound to the viewer.

Audio means, if present, comprise means for playing sound to the viewer. For example, audio means comprise items such as stereo loudspeakers, loudspeaker arrays, head phones or ear buds.

FIG. 1 displays a schematical top view of a setting wherein the method of the invention may be carried out. It comprises an autostereoscopic display device as outlined above, a virtual object displayed by the autostereoscopic display device and a viewer in a field of view of the autostereoscopic display device. The head, the hands and the feet of the viewer are drawn, wherein one foot interacts with the virtual object. The position of this foot is determined by means of the remote body tracking system (dotted line from the remote body tracking system to the foot).

The inventors realized that it is possible that certain body parts of a viewer can be observed and tracked by their respective integrated tracking system as well as by the remote body tracking system. By tracking at least one body part simultaneously by both tracking systems, it is possible to relate the position data of all other body parts obtained with the remote body tracking system to the position of the screen. In this way, the position of such body parts relative to the screen can be obtained, even when they are out of a field of view of the integrated head tracking system (or of any other conceivable integrated tracking system, since it is typically inherent to the position of any such system relative to the viewer that its field of view cannot properly cover the desired body part). In the context of the present invention, a body part of which the position is (to be) obtained in this way is termed 'a relevant body part'.

The body part that is tracked simultaneously by both tracking systems is in any case a head (a head is always present when a viewer is viewing the screen). Thus, the integrated head tracking system and the remote body tracking system both track a head. The position of a certain relevant body part of the viewer relative to the autostereoscopic display device is then determined by using the position of the head obtained by 1) the integrated head tracking system; and 2) the body tracking system.

This may for example be performed by determining the position of the relevant body part relative to the head by using the position of the relevant body part and of the head relative to the remote body tracking system; followed by deriving the position of the relevant body part of the viewer relative to the autostereoscopic display device from a) the position of the relevant body part relative to the head; and b) the position of the head relative to the autostereoscopic display device.

As stated above, the remote body tracking system does not need to have a fixed position relative to the screen and may be positioned at any suitable location relative to the screen, without knowing how its position relates to that of the screen. The fact that there is no fixed and no known position relative to the screen does not stand in the way of a position determination of the relevant body part, since the remote body tracking system just needs to provide the spatial relationship between the head and the remote body part. Given the relative nature of this relationship, the position of the remote body tracking system relative to the screen is in fact irrelevant to determining this relationship. It will therefore be acknowledged by a skilled person, that the position of the relevant body part of the viewer relative to the screen can be determined in a method according to the invention, and that this can be performed when the position of the remote body tracking system relative to the screen is not fixed and not known.

In a method of the invention, the remote body tracking system may be configured to determine the position of one or more further relevant body parts of the viewer relative to the remote body tracking system. In such case, the method may further comprise determining the position of the one or more further relevant body parts of the viewer relative to the autostereoscopic display device. This opens the way to achieving a complete body tracking with respect to the autostereoscopic display device.

Next to a head, it is possible to track an additional body part (i.e. a second body part) simultaneously by both tracking systems (i.e. by both the integrated head tracking system and the remote body tracking system). An aim of doing this may be to (again) determine the position of the relevant body part of the viewer relative to the autostereoscopic display device. In this way, the accuracy of the position of the relevant body part of the viewer may be improved, for example by determining an average of the two positions thus determined.

The additional body part to be simultaneously tracked is preferably a body part that is (just as a head) also dominant in the field of field of the screen. It is for example selected from the group of a hand, an underarm, an elbow, an upper arm, a shoulder or a torso. It is more preferably a hand. Accordingly, such method is a method wherein the autostereoscopic display device further comprises an integrated hand tracking system configured to determine the position of a hand of the viewer relative to the autostereoscopic display device;

the remote body tracking system is configured to determine the position of the head, the relevant body part and a hand of the viewer relative to the remote body tracking system;

the method further comprises the steps of 4) determining the position of a hand of the viewer relative to the autostereoscopic display device using the integrated hand tracking system;

5) determining the position of the hand of the viewer and the relevant body part of the viewer relative to the remote body tracking system using the remote body tracking system;

6)—determining the position of the relevant body part of the viewer relative to the autostereoscopic display device; and/or improving the accuracy of the position of the relevant body part of the viewer as determined in step 3);

by using the position of the hand obtained in step 4) and the position of the hand obtained in step 5).

In this method, the hand may equally be substituted by another suitable body part, typically by one selected from the group of an underarm, an elbow, an upper arm, a shoulder and a torso. Thus, a method according to the invention may be a method wherein the hand is substituted by a body part selected from the group of an underarm, an elbow, an upper arm, a shoulder and a torso.

To further improve the accuracy of the measurement of the position of the relevant body part, a method of the invention may comprise tracking even a third body part simultaneously by both tracking systems (i.e. by both the integrated head tracking system and the remote body tracking system). Preferably, such body part is also a hand. Accordingly, such method is a method wherein the autostereoscopic display device further comprises an integrated hand tracking system configured to determine the position of two hands of the viewer relative to the autostereoscopic display device; and the remote body tracking system is configured to determine the position of the head, the relevant body part, and two hands of the viewer relative to the remote body tracking system, wherein the relevant body part is not a hand;

the method further comprises the steps of 7) determining the position of two hands of the viewer relative to the autostereoscopic display device using the integrated hand tracking system;

8) determining the position of the two hands of the viewer and the relevant body part of the viewer relative to the remote body tracking system using the remote body tracking system;

9)—determining the position of the relevant body part of the viewer relative to the autostereoscopic display device; and/or improving the accuracy of the position of the relevant body part as determined in step 3) and/or step 6);

by using the position of the two hands obtained in step 7) and the position of the two hands obtained in step 8).

In this method, one or both hands may equally be substituted independently of one another by another suitable body part, typically by one or two selected from the group of an underarm, an elbow, an upper arm, a shoulder and a torso. Thus, a method according to the invention may be a method wherein the one or two hands are substituted by a body part selected from the group of an underarm, an elbow, an upper arm, a shoulder and a torso.

Once determined via a method of the invention, the determined position of the relevant body part may change after a certain time interval, as a result of movement of the viewer. It is however not necessary to repeat the entire method to account for any changes in the position of the relevant body part of the viewer. When carried out once, the position of the relevant body part relative to the screen is known. It may then suffice to just determine any movement of the relevant body part with respect to its position as determined by the method of the invention. Accordingly, a method of the invention may, after a certain time interval, be followed by using the remote body tracking system to determine a shift in the position of the relevant body part or the one or more further relevant body parts after the time interval. This can be done without using the head tracking system or the hand tracking system. The advantage of such method is that less computational force is required, leading to less power consumption and/or less latency experienced by the viewer.

In order to continuously track the relevant body part or the one or more further relevant body parts, the determination of the shift is performed a plurality of times. Typically, each repetition of the determination is performed after a certain time interval, for example a time interval in the range of 0.02-2.0 s, in particular in the range of 0.1-1.0 s.

Besides repeating the determination of the shift, it may be necessary from time to time to repeat the entire method of the invention one or more times, for example 10 times or more, 100 times or more, 1,000 times or more, 10,000 times or more 100,000 times or more or 1,000,000 times or more. This allows to accommodate for any changes in the positioning of the remote body tracking system relative to the autostereoscopic display device. For example, the method of the invention is repeated at time intervals that are in the range of 0.050-60 s, in particular in the range of 0.50-10 s, more in particular in the range of 1.0-5.0 s. Depending on the setting wherein the autostereoscopic display device (including the remote body tracking system) is used by the viewer, it may also be repeated at larger time intervals, for example at time intervals in the range of 1.0-60 minutes, or at time intervals in the range of 1-10 hours. A method of the invention may also be performed only once during a viewing session by the viewer, which is then typically at the start of the session.

The invention claimed is:

1. A method for tracking a relevant body part of a viewer of an autostereoscopic display device, wherein the autostereoscopic display device comprises:

an integrated head tracking system configured to determine the position of the head of the viewer relative to the autostereoscopic display device; and a remote body tracking system configured to determine the position of the head and the relevant body part of the viewer relative to the remote body tracking system;

wherein the method comprises the steps of;

1) Determining the position of the head of the viewer relative to the autostereoscopic display device using the integrated head tracking system;

2) Determining the position of the head and the relevant body part of the viewer relative to the remote body tracking system using the remote body tracking system; and 3) Determining the position of the relevant body part of the viewer relative to the autostereoscopic display device using the position of the head obtained in step 1) and the position of the head obtained in step 2).

2. The method according to claim 1, wherein step 3) comprises:

determining the position of the relevant body part relative to the head by using the position of the relevant body part and the head relative to the remote body tracking system as determined in step 2; and deriving the position of the relevant body part relative to the autostereoscopic display device from a) the position of the relevant body part relative to the head; and b) the position of the head relative to the autostereoscopic display device.

3. The method according to claim 1, wherein the autostereoscopic display device further comprises an integrated hand tracking system configured to determine the position of a hand of the viewer relative to the autostereoscopic display device; and the remote body tracking system is configured to determine the position of the head, the relevant body part and a hand of the viewer relative to the remote body tracking system; and wherein the method further comprises the steps of:

4) Determining the position of a hand of the viewer relative to the autostereoscopic display device using the integrated hand tracking system;

5) Determining the position of the hand and the relevant body part relative to the remote body tracking system using the remote body tracking system;

6) determining the position of the relevant body part relative to the autostereoscopic display device; and/or improving the accuracy of the position of the relevant body part as determined in step 3);
   by using the position of the hand obtained in step 4) and the position of the hand obtained in step 5).

4. The method according to claim 1, wherein the autostereoscopic display device further comprises an integrated hand tracking system configured to determine the position of two hands of the viewer relative to the autostereoscopic display device; and the remote body tracking system is configured to determine the position of the head, the relevant body part, and two hands of the viewer relative to the remote body tracking system, wherein the relevant body part is not a hand;

wherein the method further comprises the steps of:

7) Determining the position of two hands of the viewer relative to the autostereoscopic display device using the integrated hand tracking system;

8) Determining the position of the two hands and the relevant body part relative to the remote body tracking system using the remote body tracking system; and 10) determining the position of the relevant body part relative to the autostereoscopic display device; and/or improving the accuracy of the position of the relevant body part as determined in step 3) and/or step 6);
   by using the position of the two hands obtained in step 7) and the position of the two hands obtained in step 8).

5. The method according to claim 1, wherein the remote body tracking system is further configured to determine the position of one or more further relevant body parts of the viewer relative to the remote body tracking system; and wherein the method further comprises determining the position of the one or more further relevant body parts of the viewer relative to the autostereoscopic display device.

6. The method according to claim 1, wherein, after a certain time interval, the method is followed by using the remote body tracking system to determine a shift in the position of the relevant body part or the one or more further relevant body parts after the time interval.

7. The method according to claim 6, wherein the determination of the shift is performed a plurality of times, each time after a certain time interval, so that the relevant body part or the one or more further relevant body parts can be tracked.

8. The method according to claim 7, wherein the time interval is in the range of 0.02-2.0 s.

9. The method according to claim 7, wherein the time interval is in the range of 0.1-1.0 s.

10. The method according to claim 1, wherein the method is repeated one or more times.

11. The method according to claim 1, wherein the remote body tracking system is configured to track the position of one or more body parts selected from the group consisting of torso, knees, elbows, forearms, upper arms, shoulders, lower legs, upper legs, hips, hands and feet.

12. The method according to claim 1, wherein the autostereoscopic display device is selected from the group consisting of televisions, monitors, desktop computers, laptops, cinema display systems, mobile phones, tablets and game consoles.

13. The method according to claim 1, wherein the method is repeated one or more times at time intervals that are in the range of 0.050-60 s.

14. The method according to claim 1, wherein the method is repeated one or more times at time intervals that are in the range of 0.50-10 s.

15. The method according to claim 1, wherein the method is repeated one or more times at time intervals that are in the range of 1.0-5.0 s.

* * * * *